(12) United States Patent
Senninger et al.

(10) Patent No.: US 9,149,745 B2
(45) Date of Patent: Oct. 6, 2015

(54) DRINKING WATER FILTER WITH INTEGRAL SELF-DISINFECTING DELIVERY SYSTEM

(71) Applicant: Whirlpool Corporation, Benton Harbor, MI (US)

(72) Inventors: Mark Senninger, St. Joseph, MI (US); Corey Gooden, St. Joseph, MI (US); Steven Kuehl, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 124 days.

(21) Appl. No.: 13/832,052

(22) Filed: Mar. 15, 2013

(65) Prior Publication Data
US 2014/0263066 A1    Sep. 18, 2014

(51) Int. Cl.
| | |
|---|---|
| B01D 35/02 | (2006.01) |
| B01D 29/21 | (2006.01) |
| B01D 29/23 | (2006.01) |
| F25D 23/12 | (2006.01) |
| C02F 1/00 | (2006.01) |

(52) U.S. Cl.
CPC ............... *B01D 35/02* (2013.01); *B01D 29/21* (2013.01); *B01D 29/232* (2013.01); *F25D 23/126* (2013.01); *C02F 1/001* (2013.01); *C02F 2307/12* (2013.01); *F25D 2323/121* (2013.01)

(58) Field of Classification Search
USPC ......... 210/510.1, 694, 691, 416.3, 501, 502.1
See application file for complete search history.

(56) References Cited

U.S. PATENT DOCUMENTS

| | | | |
|---|---|---|---|
| 3,695,642 A * | 10/1972 | DeWoody | ................... 285/148.3 |
| 4,895,651 A | 1/1990 | Middleton | |
| 5,538,746 A | 7/1996 | Levy | |
| 5,612,522 A | 3/1997 | Levy | |
| 5,616,243 A | 4/1997 | Levy | |
| 6,241,893 B1 | 6/2001 | Levy | |
| 6,574,984 B1 * | 6/2003 | McCrea et al. | ................. 62/449 |
| 7,112,280 B2 | 9/2006 | Hughes et al. | |
| 7,169,304 B2 | 1/2007 | Hughes et al. | |
| 7,201,856 B2 | 4/2007 | Souter et al. | |

(Continued)

FOREIGN PATENT DOCUMENTS

| | | |
|---|---|---|
| RU | 2040303 C1 | 11/1991 |
| RU | 2163161 C1 | 7/1999 |

(Continued)

OTHER PUBLICATIONS

International Patent Application No. PCT/US201423482 filed Mar. 11, 2014, Applicant: Whirlpool Corporation. International Search Report and Written Opinion re: same, mail date Aug. 7, 2014.

*Primary Examiner* — Chester Barry

(57) ABSTRACT

An aspect of the present invention is generally directed toward an appliance that includes a water source inlet that receives intake water from a water source and a water outlet proximate a water dispensing location on a door of the appliance in fluid communication with one another via one or more water conduits spaced within the appliance. The appliance also includes a removable water filter and dispenser assembly configured to be removably engaged and disengaged with the water outlet of the appliance by hand without the use of tools. The removable water filter and dispenser assembly includes: (1) a housing that includes at least one water treatment media; and (2) a treated water dispensing outlet configured to deliver water treated by the at least one water treatment media for use or consumption.

22 Claims, 20 Drawing Sheets

(56) References Cited

U.S. PATENT DOCUMENTS

| | | |
|---|---|---|
| 7,272,947 B2 | 9/2007 | Anderson et al. |
| 7,316,323 B2 | 1/2008 | Collias et al. |
| 7,374,680 B2 | 5/2008 | Hughes et al. |
| 7,614,506 B2 * | 11/2009 | Mitchell et al. ............... 210/506 |
| 7,615,152 B2 | 11/2009 | Tanner et al. |
| 7,850,859 B2 | 12/2010 | Tanner et al. |
| 7,886,557 B2 | 2/2011 | Anderson et al. |
| 7,896,165 B2 | 3/2011 | Hakola |
| 8,104,305 B2 * | 1/2012 | An et al. ......................... 62/389 |
| 8,622,224 B2 * | 1/2014 | Wang et al. ................... 210/504 |
| 8,622,244 B2 * | 1/2014 | Stoeckli et al. ................ 222/83 |
| 2007/0175919 A1 * | 8/2007 | Hortin et al. .................... 222/64 |
| 2008/0011008 A1 * | 1/2008 | Cur et al. ........................ 62/338 |
| 2008/0110820 A1 | 5/2008 | Knipmeyer et al. |
| 2009/0001011 A1 | 1/2009 | Knipmeyer et al. |
| 2009/0025826 A1 * | 1/2009 | Meuleners et al. ........... 141/351 |
| 2011/0278242 A1 * | 11/2011 | Levy ............................. 210/806 |
| 2012/0285192 A1 * | 11/2012 | Mitchell et al. ................ 62/318 |

FOREIGN PATENT DOCUMENTS

| | | |
|---|---|---|
| RU | 2183493 C2 | 6/2000 |
| RU | 2238786 C1 | 8/2003 |
| WO | 2005052477 A1 | 6/2005 |
| WO | 2005084776 A1 | 9/2005 |
| WO | 2006110632 A2 | 10/2006 |

* cited by examiner

DRINKING WATER FILTER WITH INTEGRAL SELF-DISINFECTING DELIVERY SYSTEM

BRIEF SUMMARY OF THE INVENTION

Water filters 1 are commonly used in connection with an appliance 10. Typically, as shown in FIGS. 1 and 2, the filters 2 are accessed and positioned within the upper right of the interior of an appliance 3 and accessed by opening an access door at the bottom of the appliance 4. Water lines, typically from a municipal water source or well, feed a filter head assembly that receives the filter 2, the untreated water passes through the filter and is treated by the filter and subsequently delivered via fluid conduits 5 in the appliance to the filtered water's point of use. One such point of use is a water dispenser 6 on the front of the refrigerator. These water filters are often activated carbon containing water filters that typically remove chlorine, other ions and other components that prevent bacteria in the water. However, the removal of the chlorine and similar components prior to the dispensing and use potentially allows for the build-up of bio-film and other bacteria within the water lines that deliver the filtered water to the dispenser thereby causing a "flat," "stale" or "off-taste" for some who taste water from these sources, including the water dispenser, faucet or ice maker.

These and other features, advantages, and objects of the present invention will be further understood and appreciated by those skilled in the art by reference to the following specification, claims, and appended drawings.

SUMMARY OF THE INVENTION

An aspect of the present invention is generally directed toward an appliance that includes a water source inlet that receives intake water from a water source and a water outlet proximate a water dispensing location on a door of the appliance in fluid communication with one another via one or more water conduits spaced within the appliance. The appliance also includes a removable water filter and dispenser assembly configured to be removably engaged and disengaged with the water outlet of the appliance by hand without the use of tools. The removable water filter and dispenser assembly includes: (1) a housing having at least one side wall, a top, and a bottom defining an interior volume; a water outlet engagement system that fluidly engages the removable water filter and dispenser assembly and the water outlet in a fluid tight manner and configured to allow water received from the water outlet into engagement with one or more water treatment media spaced within the interior volume of the housing; and (2) a treated water dispensing outlet, which is typically integral with the housing, configured to deliver water treated by the at least one water treatment media for use or consumption.

Yet another aspect of the present invention is generally directed to a method of filtering water being dispensed from an appliance and periodically replacing a water filter of the appliance and a water dispensing outlet of the appliance comprising the steps of: installing, a first removable water filter and dispenser assembly into fluid engagement with a water outlet of an appliance proximate a water dispensing location on the door of the appliance by hand without the use of tools that includes: a housing having at least one side wall, a top, and a bottom defining an interior volume; a water outlet engagement system that fluidly engages the removable integral water filter and dispenser assembly and the water outlet in a fluid tight manner and configured to allow water received from the water outlet into engagement with one or more water treatment media spaced within the interior volume of the housing; and a treated water dispensing outlet; filtering and dispensing water for consumption by a user of the appliance through the treated water dispensing outlet for a period of time using the first removable water filter and dispenser assembly; disengaging the first removable water filter and dispenser assembly by hand and without the use of tools; and installing a second removable water filter and dispenser assembly into fluid engagement with the water outlet of the appliance proximate a water dispensing location on the door of the appliance by hand without the use of tools wherein the second removable water filter and dispenser assembly that includes: a housing having at least one side wall, a top, and a bottom defining an interior volume; a water outlet engagement system that fluidly engages the removable integral water filter and dispenser assembly and the water outlet in a fluid tight manner and configured to allow water received from the water outlet into engagement with one or more water treatment media spaced within the interior volume of the housing; and a treated water dispensing outlet.

Another aspect of the present invention includes a removable and integral water filter and dispenser assembly configured to be removably engaged and disengaged with the water outlet of the appliance by hand without the use of tools by rotating the removable and integral water filter and dispenser about an axis of rotation or through a curvilinear pathway including: a housing having side walls, a top and a bottom defining an interior volume; a water dispensing outlet engagement system that fluidly engages the removable integral water filter and dispenser assembly and the water dispensing outlet in a fluid tight manner and configured to allow water received from the water outlet of the appliance into engagement with a water treatment media spaced within the interior volume of the housing wherein the water treatment media comprises at least one water treatment media chosen from the group consisting of: activated carbon particles, mesoporous activated carbon, activated carbon powder, particles sintered with a plastic binder, carbon particles coated with a silver containing material, a block of porous carbon, ion exchange material, resin beads, flat filtration membranes, fibrous filtration structures, zeolite particles or coatings, polyethylene, charged-modified glass webs, melt blown glass webs, microfiber glass webs, alumina, an aluminosilicate material, and a diatomaceous earth; and a downwardly extending treated water dispensing outlet integral with the bottom of the housing and configured to deliver water treated by the at least one water treatment media for use or consumption.

DETAILED DESCRIPTION

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention. In this specification and the appended claims, the singular forms "a," "an" and "the" include plural reference unless the context clearly dictates otherwise.

As shown in FIGS. 3-20C, the present invention is generally directed toward periodically replaceable, integrated water filter and dispenser assemblies 20. The water filter and dispenser assemblies 20 typically contain a funnel shaped bottom portion 22. In addition, the water filter and dispenser assemblies 20 have a water dispensing outlet 24. The water filter and dispenser assemblies are configured to treat water and dispense treated water out of the water dispensing outlet 24 and the water leaving the outlet 24 does not travel through further appliance water conduits. Instead, the water filter and dispenser assembly are both replaced each time the assembly is replaced ensuring a self-disinfecting feature.

Figure 1:
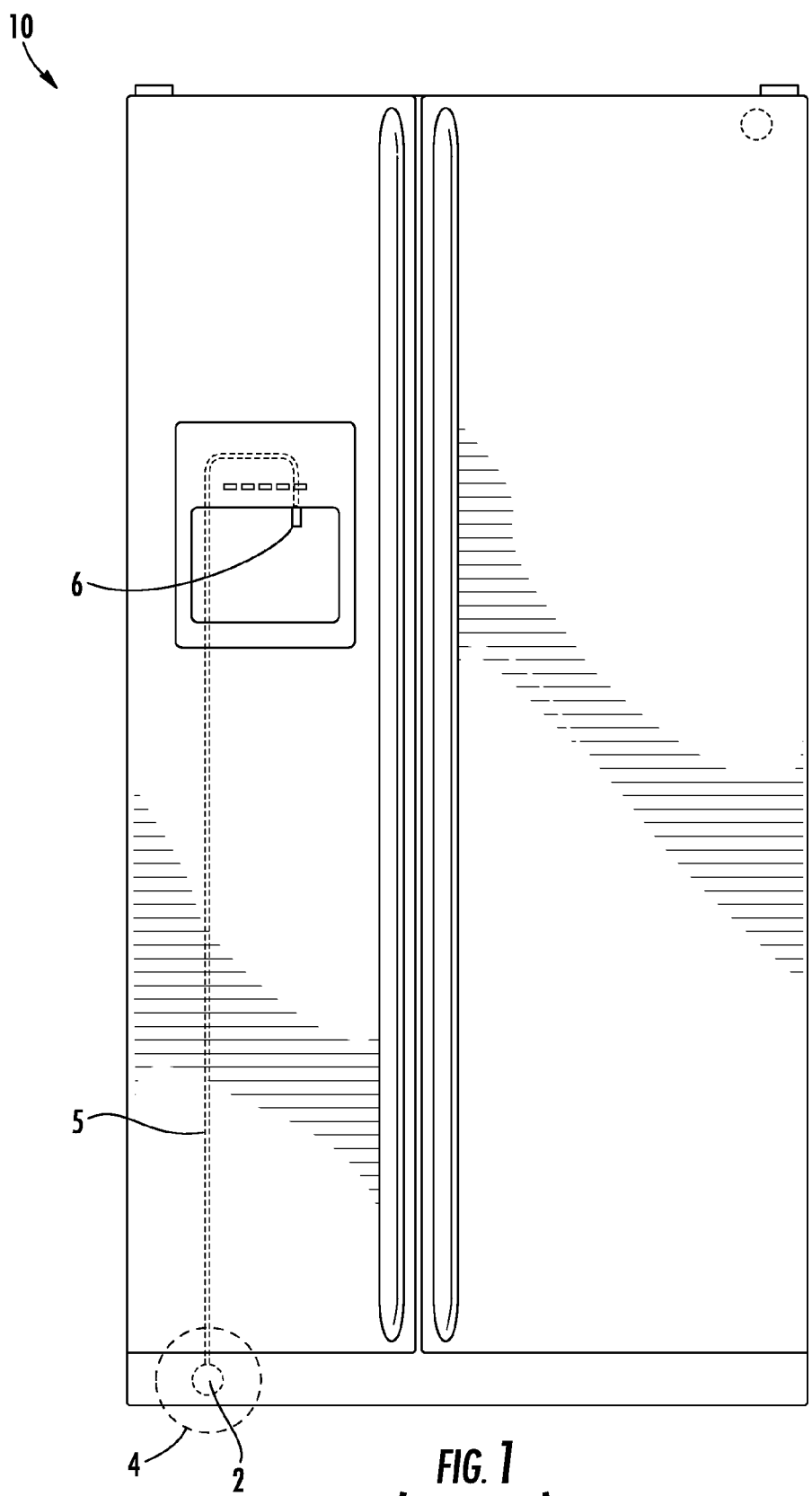
FIG. 1 is an elevated front schematic view of a side by side refrigerator and freezer system of the prior art having water filter positioned in the bottom left grill portion.
Figure 2:
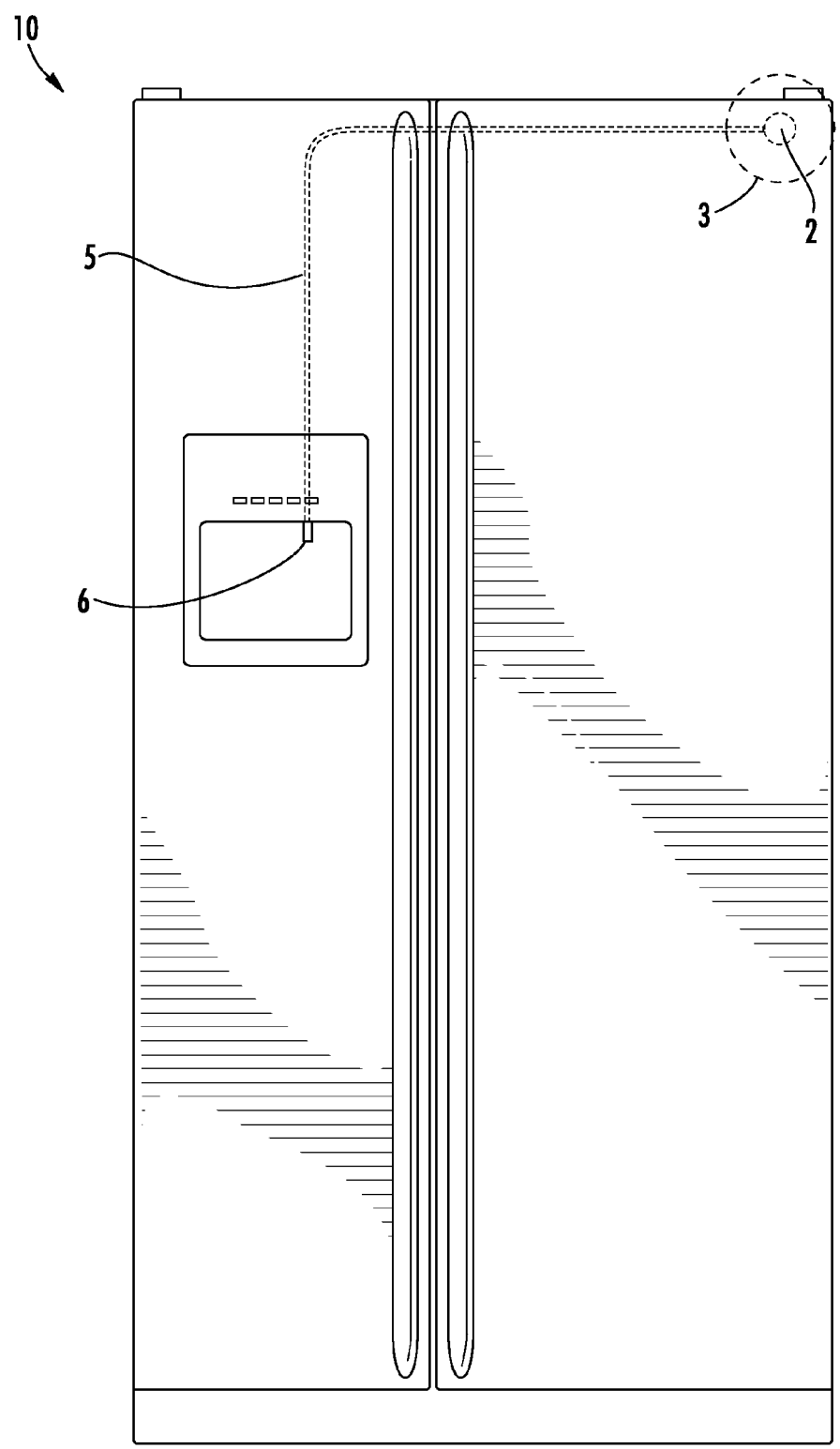
FIG. 2 is an elevated front schematic view of a side by side refrigerator and freezer system of the prior art having a filter positioned in the upper right interior of the appliance.
Figure 3:
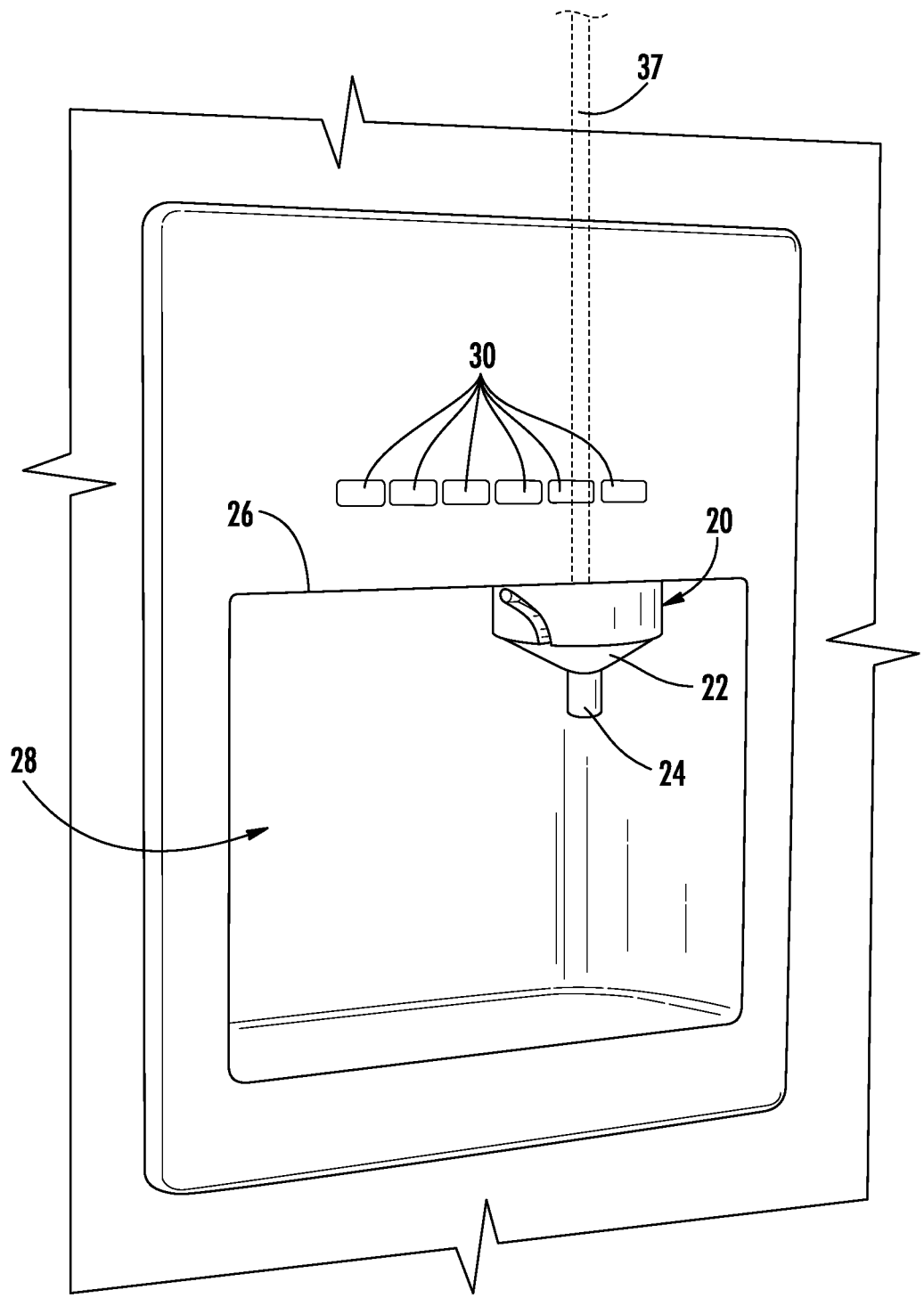
FIG. 3 is an enlarged perspective view of a water and ice dispenser of an appliance showing an (integrated) water filter and dispenser assembly of an aspect of the present invention.

As shown in FIG. 3, the water filter and dispenser assembly is engaged to the ceiling portion 26 of the water and ice dispenser 28, which is typically a recessed portion in a front door of the appliance. Typically the dispenser is positioned on the front of the door that allows access to the freezer compartment, but conceivably the dispenser 28 could be located on the front surface of the front of the door that allows access to the fresh food compartment. Typically, the dispenser has a plurality of user actuated inputs, which can be paddles, a touch screen that interacts with a controller, or, as shown in FIG. 3, one or more user activated buttons 30.

The water filter and dispenser assemblies also contain a water treatment medium 32. The water treatment medium 32 contained in individual cartridges may also be chosen from the group consisting of carbon (e.g., activated carbon particles, such as mesoporous activated carbon, carbon powder, particles sintered with a plastic binder, carbon particles coated with a silver containing material, or a block of porous carbon); an activated carbon particle with alumninosilicate bonded with titanium dioxide and nanoparticulate zinc oxide ion exchange material (e.g., resin beads, flat filtration membranes, fibrous filtration structures, etc.); zeolite particles or coatings (e.g., silver loaded); polyethylene; charged-modified, melt-blown, or microfiber glass webs; alumina; alumninosilicate material; and diatomaceous earth. The water treatment medium 32 may also be impregnated or otherwise disposed on a porous support substrate, such as a fabric material, a paper material, a polymer screen, or other conceivable porous structures that may be contained in the individual cartridges, which in some instances may be configured to allow the fluid to flow across the support substrate and not through the support substrate. The treatment medium 32 is typically an activated carbon particle with alumninosilicate bonded with titanium dioxide and nanoparticulate zinc oxide or a molded, formed or extruded activated carbon with alumninosilicate such as available from Selecto Scientific of Suwanee, Ga. or fibrillated adsorbent cellulose technology (FACT) from KX Industries of West Haven, Conn. The FACT media is made using various adsorbents immobilized by fibrillated nanofibers. The media is produced in a wet laid process yielding an extremely uniform media, where high percentages of very small adsorbents can be immobilized down to 1 micron average particle size efficiently. The smaller fibers produce a larger relative pore area for a given pore size. This results in a structure with a lower overall pressure drop and a high dirt and other particulate capacity. The FACT fibers can be as small as 50 nanometers in diameter. The water treatment media may reduce chloramines by at least about 80% compared to the municipal water initially received by the appliance. The water media typically also reduces bacteria by log 4 or more and reduces algae from about 50% to about 80% while maintaining a water flow through the water treatment media at a rate of at least 1 liter per minute.

Figure 4:
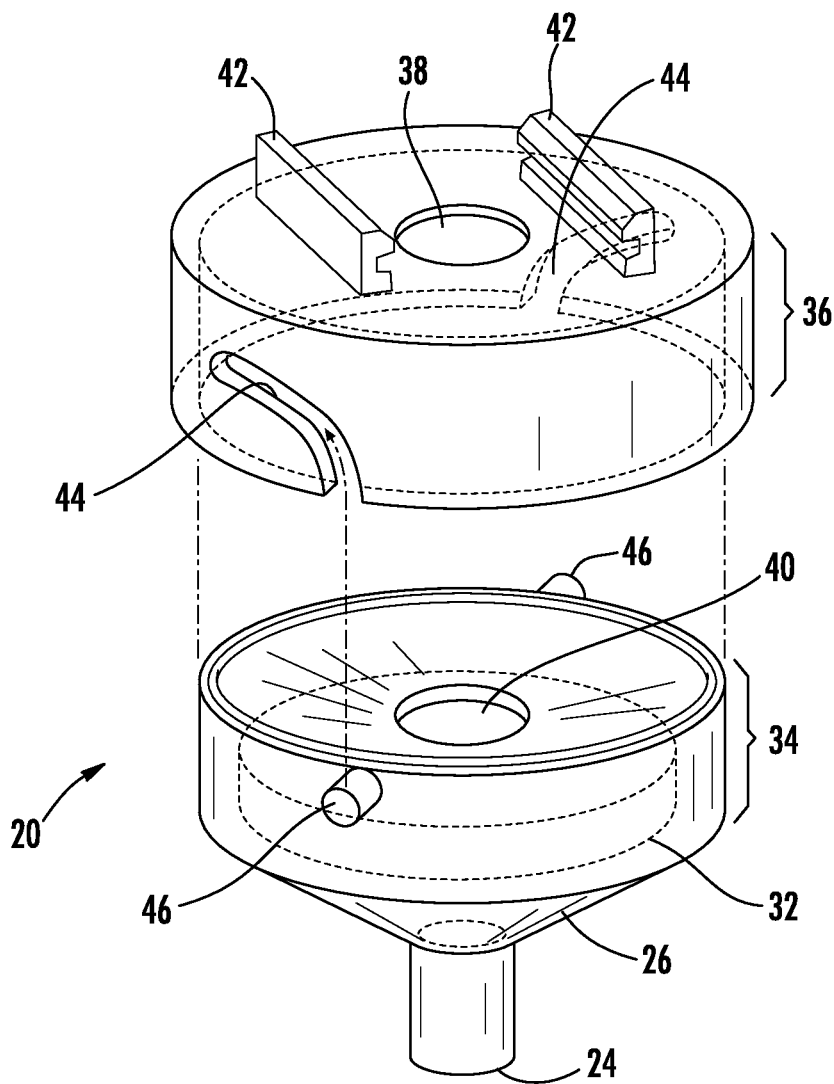
FIG. 4 is an exploded perspective view of an (integrated) water filter and dispenser assembly.

As shown in FIG. 4, the water treatment medium 32 is positioned typically within an upper portion 34 of the water filter and dispenser assemblies 20 of the present invention. The upper portion 34, as shown in FIGS. 3-4 may be engaged to the water dispenser 28 using a mating bracket 36 that may engaged within an element or elements within the appliance or to the ceiling 26 of the dispenser 28. As shown in FIG. 4, the bracket 36 has a central aperture 38 that is typically shaped to matingly receive at least a portion of the upper portion 34 of the water filter and dispenser assembly 20. The central aperture 38 of the mating bracket 36 receives water from an appliance water conduit and typically aligns with a central aperture of the water filter and dispenser assembly to deliver water to the interior of the water filter and dispenser assembly and into contact with the water treatment medium.

As also shown in FIG. 4, the mating bracket 36 has appliance engagement members 42, which, in the aspect shown in FIG. 4, are two snap-fitting bars that snap into engagement with grooves in a surface of a component of the appliance, which is typically positioned recessed in the appliance proximate the water dispenser ceiling 26 or in the water dispensing ceiling itself. The bracket 36 shown in FIG. 4 also contains opposed curved grooves 44 on its side surface that matingly receive and engage laterally outwardly extending mounting pegs 46. The water filter and dispenser assembly 20 engages the bracket 36 by insertion of the pegs 46 and rotation of the assembly 20 into full engagement with the grooves 44, as shown by the arrow in FIG. 4.

Figure 5:
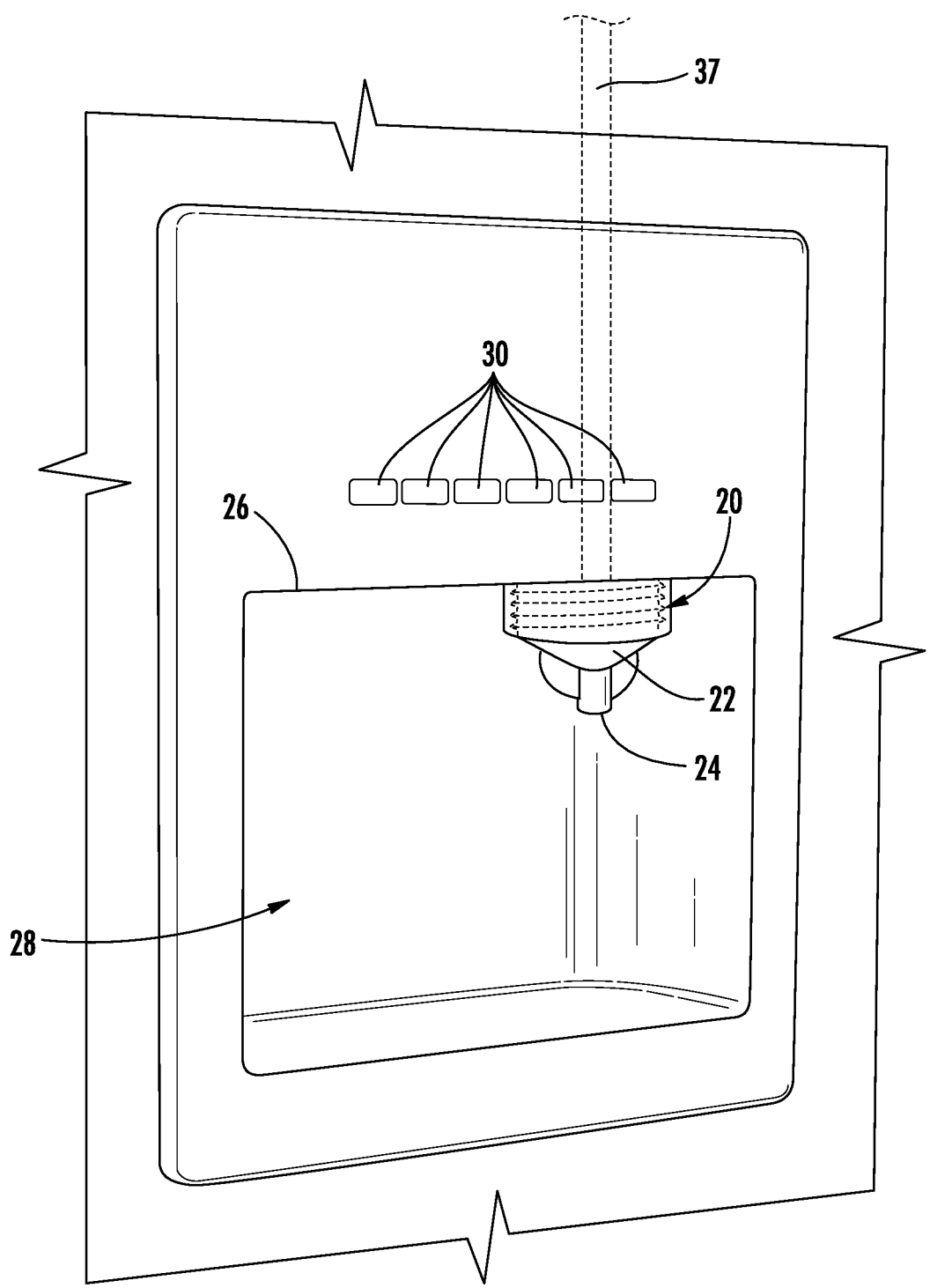
FIG. 5 is an enlarged perspective view of a water and ice dispenser of an appliance showing a water filter system of an aspect of the present invention.
Figure 6:
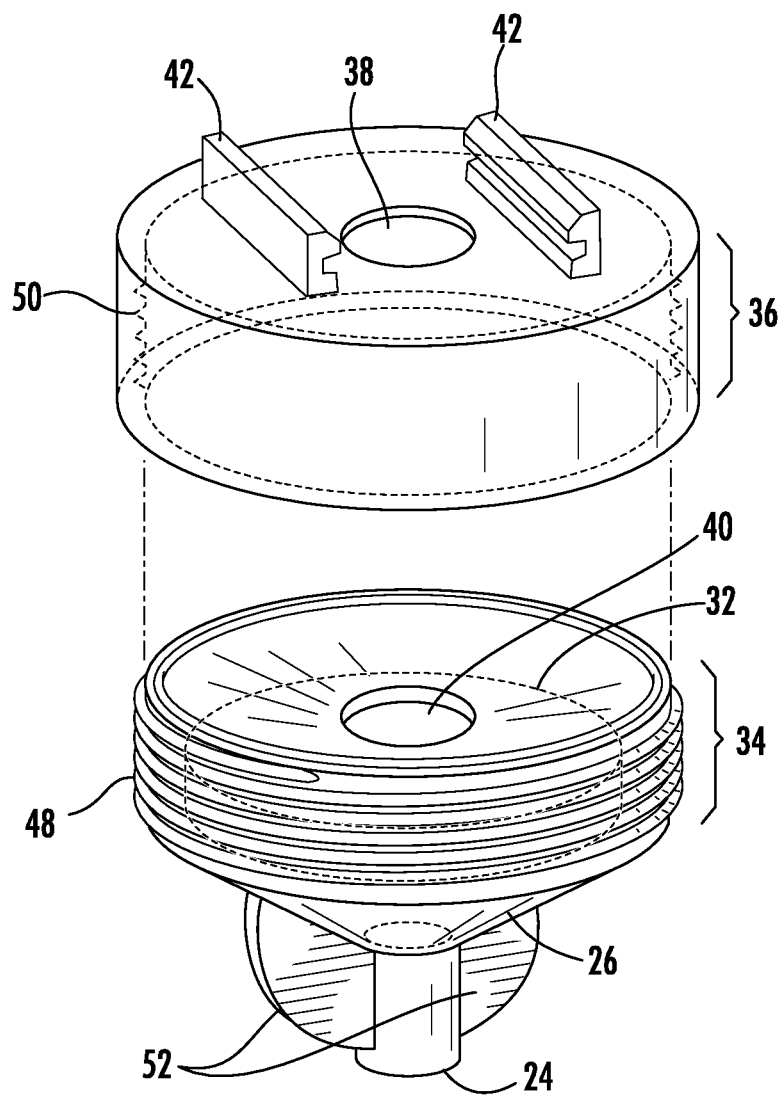
FIG. 6 is an exploded perspective view of an (integrated) water filter and dispenser assembly.

An alternative embodiment of a water filter and dispenser assembly similar to the embodiment of FIGS. 3-4 is shown in FIGS. 5-6. The water filter and dispenser assembly of FIGS. 5-6 has some additional and different features. In the water filter and dispenser assembly of FIGS. 5-6 the mating bracket 36 does not contain grooves to receive pegs and the filter and dispenser assembly does not contain laterally extending pegs. Instead, the water filter and dispenser assembly 20 has external threads 48 that mate with internal threads 50 on the interior surface of the mounting bracket 36. Additionally, the funnel shaped bottom portion 22 may contain wings 52 that oppose one another and facilitate rotation of the water filter and dispenser assembly 20 into engagement and out of engagement with the bracket 36 by supplying a more easily grasped surface for rotation of the assembly by hand and without the use of tools by the installer or owner of the appliance. While shown only in FIGS. 4-5, these same wings 52 might be employed in other aspects of the invention where rotation is desired such as the device of FIGS. 3-4.

Figure 7A:
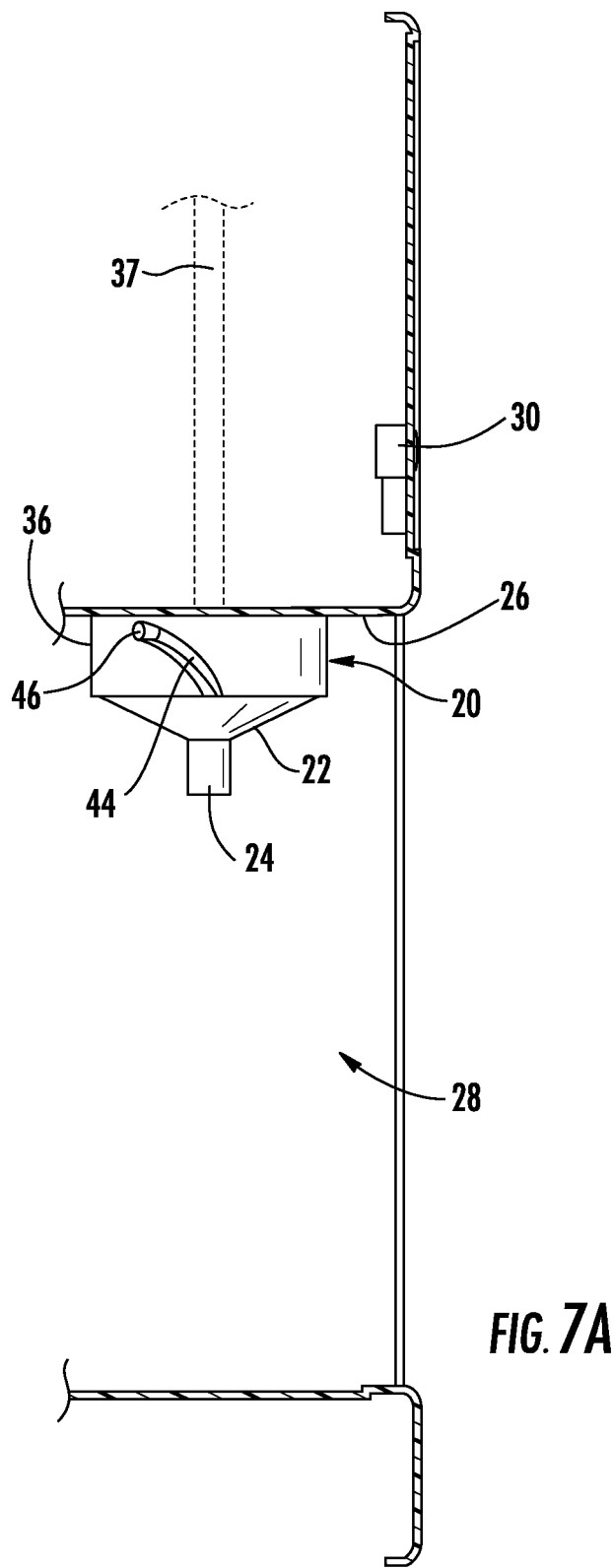
FIG. 7A is an elevated cross-sectional view of a water dispenser of FIG. 3 with the (integrated) water filter and dispenser assembly and positioned below the ceiling of the dispensing area of the appliance.
Figure 7B:
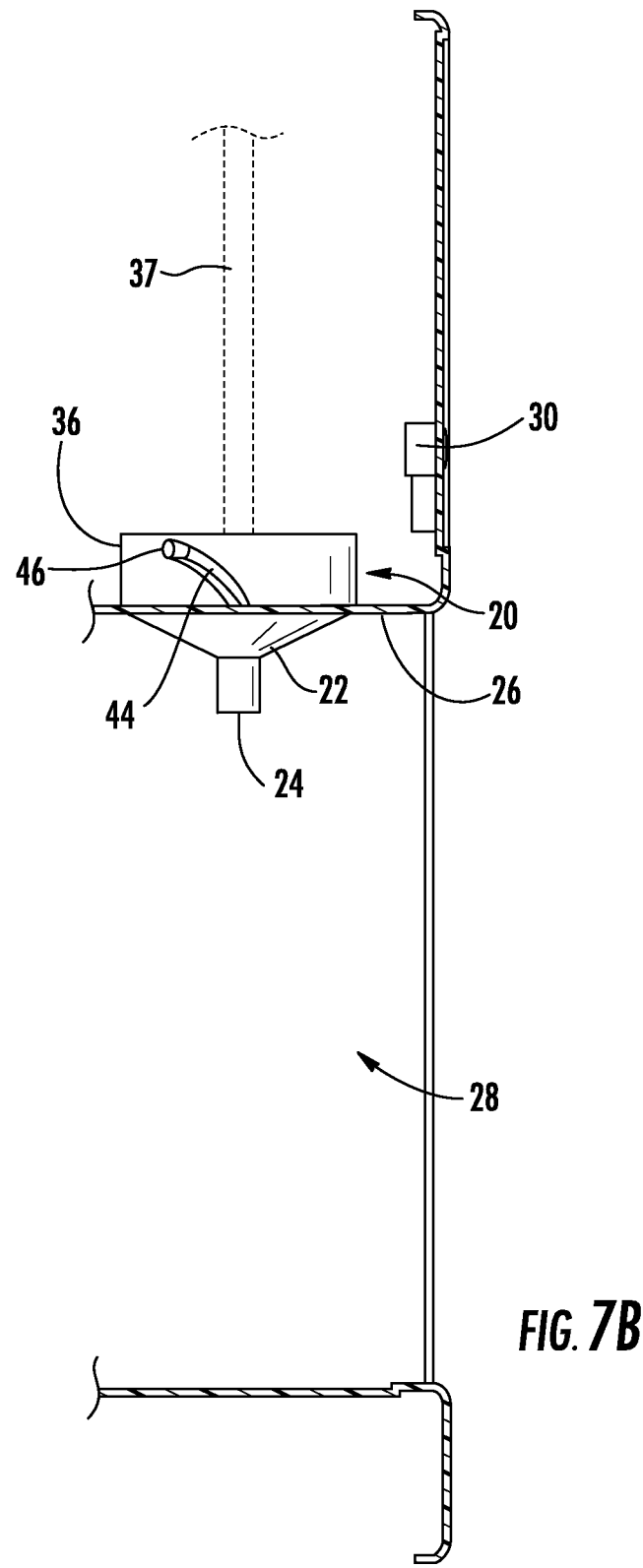
FIG. 7B is an elevated cross-sectional view of a water dispenser of FIG. 3 with the (integrated) water filter and dispenser assembly and positioned above or level with the ceiling of the dispensing area of the appliance.
Figure 8:
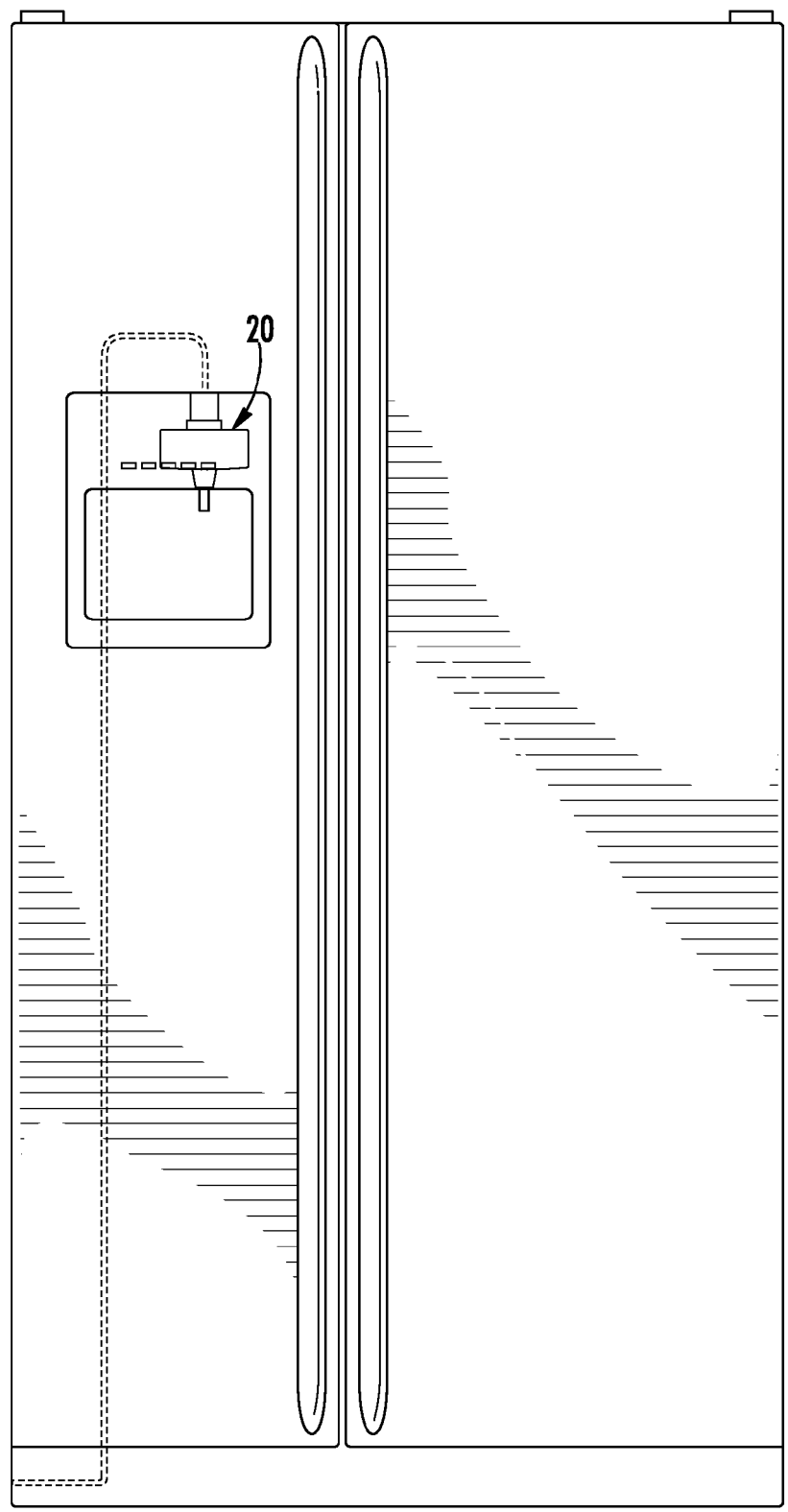
FIG. 8 is an elevated front schematic view showing an (integrated) water filter and dispenser assembly engaged with the fluid conduit outlet of the dispenser.
Figure 9:
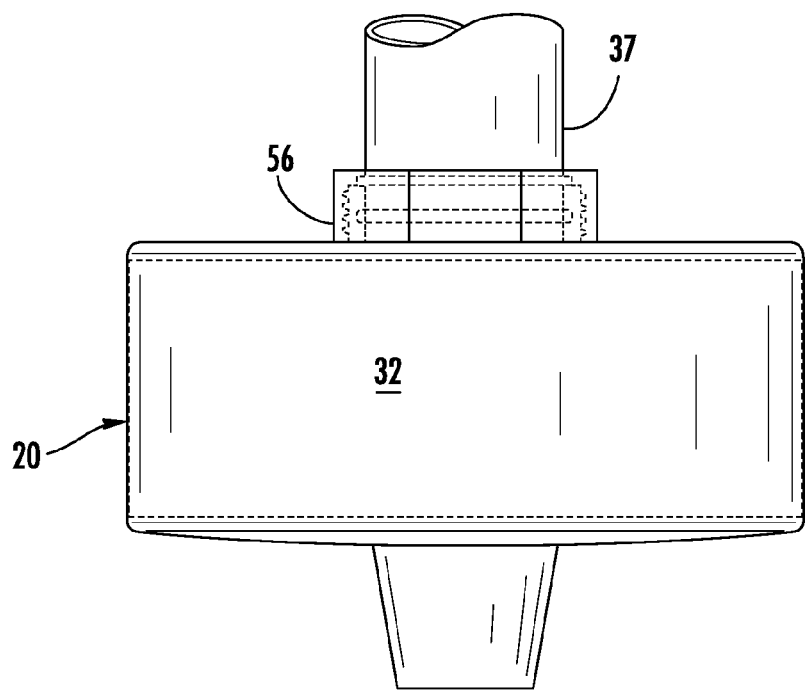
FIG. 9 is a side schematic view showing the general flow path of water through the filter shown in FIG. 8.
Figure 10:
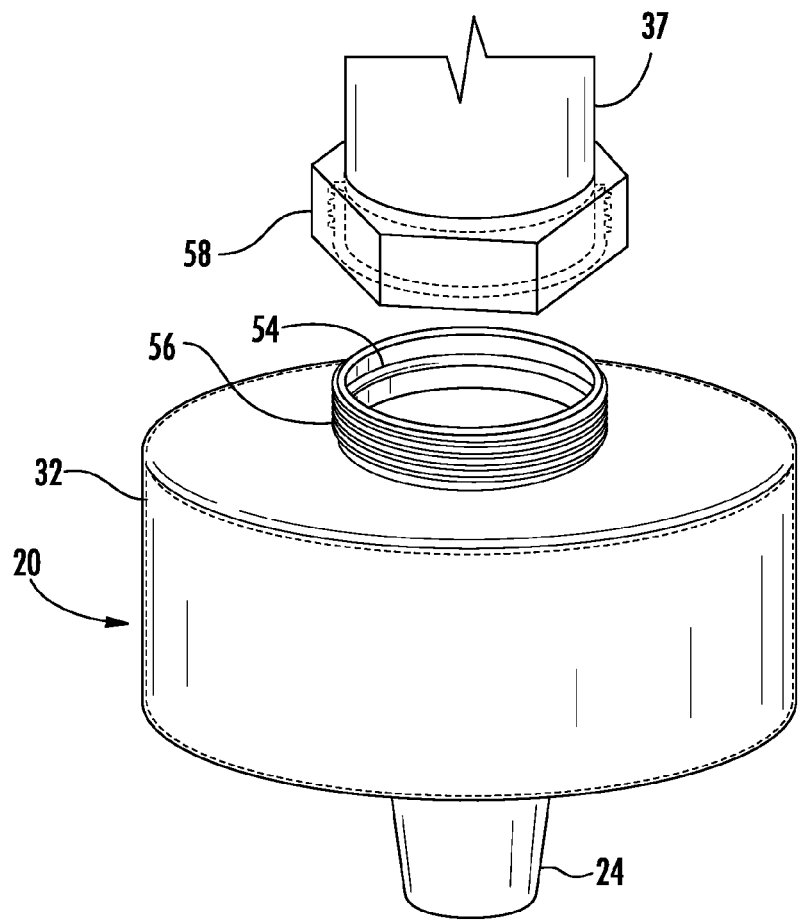
FIG. 10 is an exploded perspective view showing the filter of FIG. 8.
Figure 11:
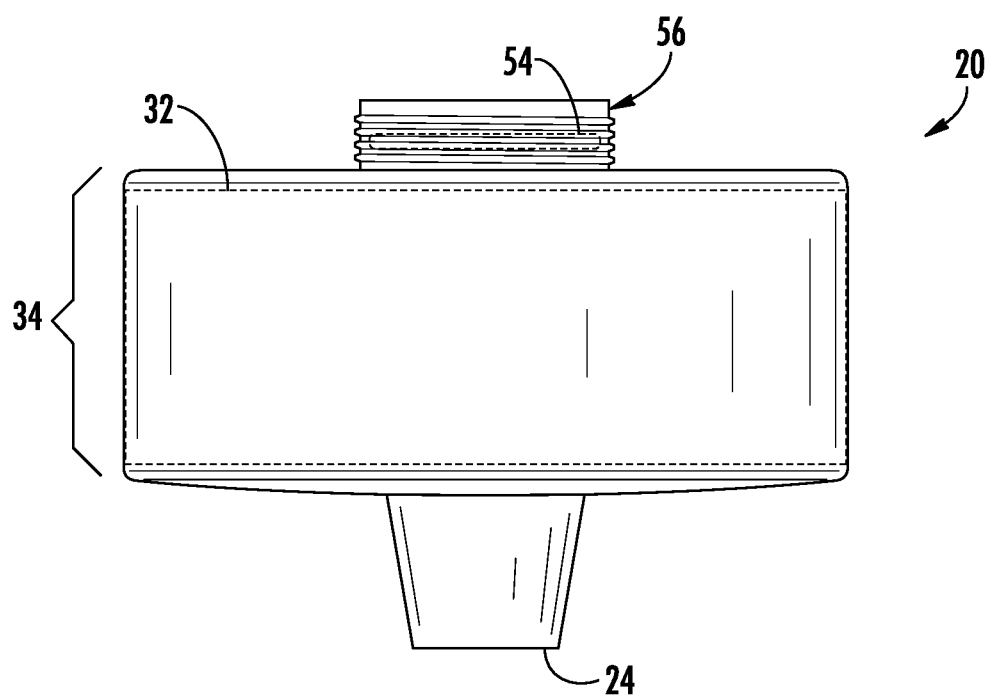
FIG. 11 is an elevated side view of the filter of FIG. 8.

FIGS. 7A and 7B show a side view of the device of FIGS. 3-4 installed into engagement with the appliance 10. As shown in FIG. 7A, the water filter and dispensing assembly 20 may be mounted into engagement with the ceiling 26 of the water dispenser 28. As shown in FIG. 7B, the water filter and dispensing assembly 20 may be mounted into engagement with the appliance at a location above the ceiling 26 and inside the appliance housing such that less of the assembly is visible and a more traditional aesthetic appearance results.

Another integral water filter and dispenser assembly of the present invention is shown in FIGS. 8-11. The water filter and dispenser assembly shown in FIGS. 8-11, typically has a cylindrical shaped water treatment medium 32 that is typically sized to matingly engage the interior volume of the upper portion 34 of the assembly 20 the water treatment medium is typically adhered to the housing an adhesive, typically a hot melt adhesive, to seal against by-pass flow. The water filter and dispenser assembly 20 is pushed onto an existing water outlet of the appliance using a force fit and one, two or more internal O-rings 54. The water filter and dispenser assembly 20 of FIGS. 8-11 may or may not have a funnel portion despite the fact that a funnel portion channeling treated water that passes through the water treatment medium is not shown in FIGS. 8-11. The assembly 20 of FIG. 8-11 typically has a top collar portion 56 that has the O-ring(s) 54 on the interior surface. The top collar portion 56 matingly engages the appliance water conduit 37 and a compression nut 58 or other fastener. The water enters the water filter and dispensing assembly 20 through the aperture encompassed by the top collar portion 56 and water passes through the water treatment medium 32 and out the outlet 24.

Figure 12:
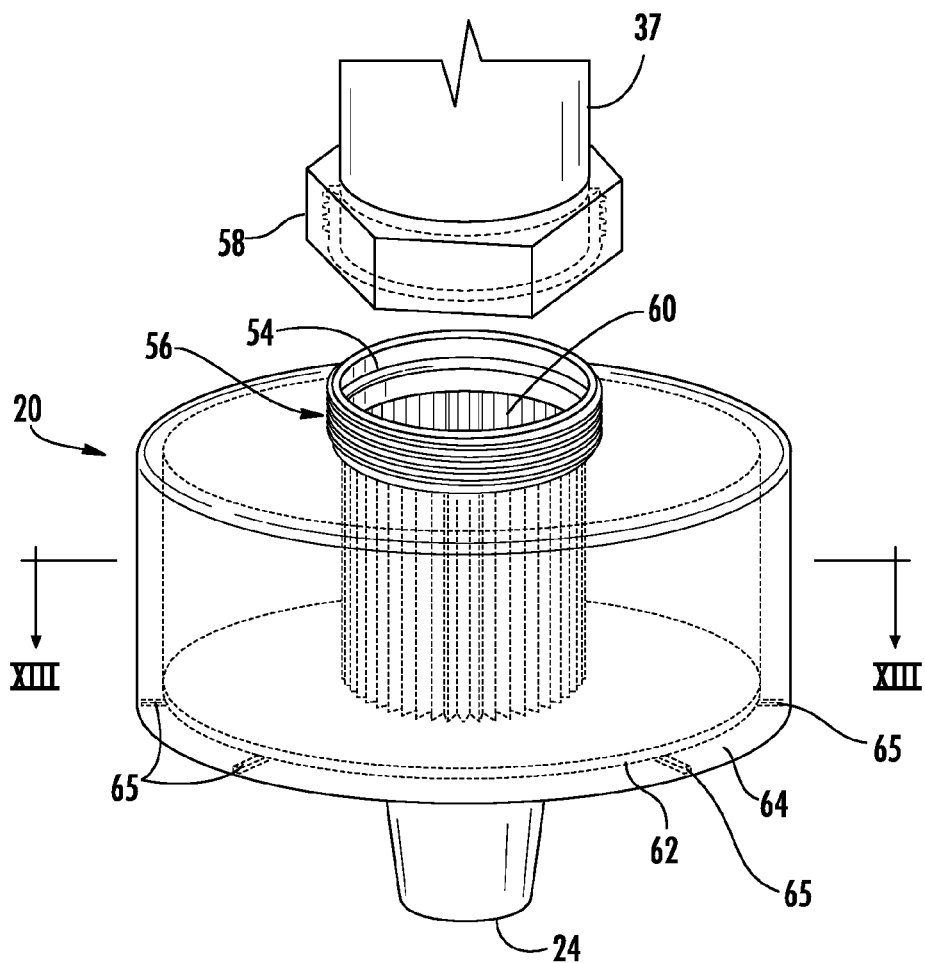
FIG. 12 is an exploded perspective view of a (integrated) water filter and dispenser assembly according to another aspect of the present invention.
Figure 12A:
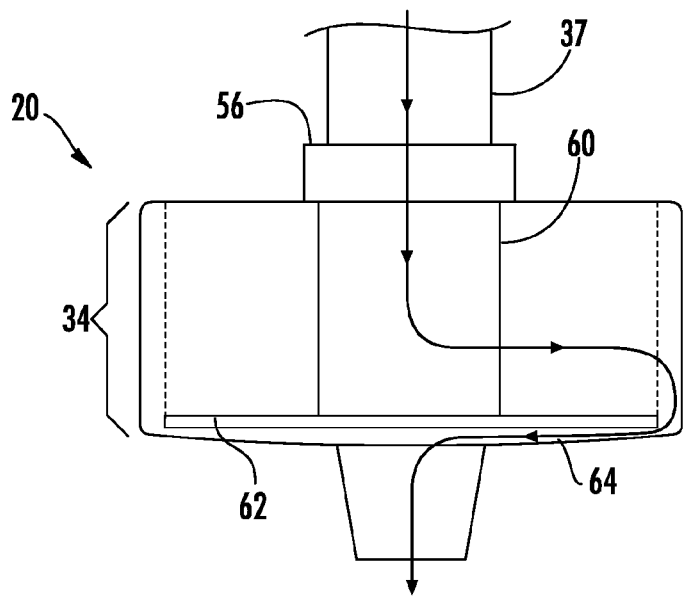
FIG. 12A is an elevated side schematic view showing the general flow path of water through the filter of FIG. 12.
Figure 13:
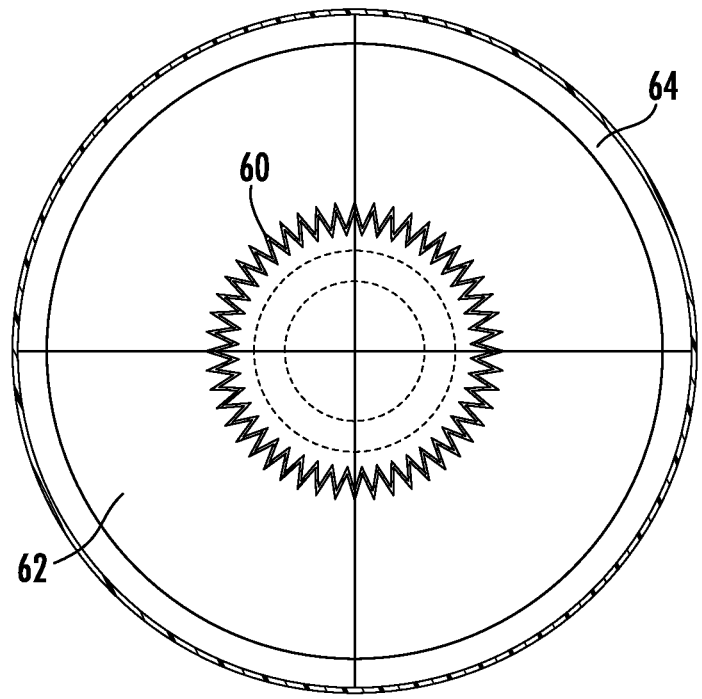
FIG. 13 is top cross-sectional view of the (integrated) water filter and dispenser assembly of FIG. 12 taken along line XIII-XIII.
Figure 14:
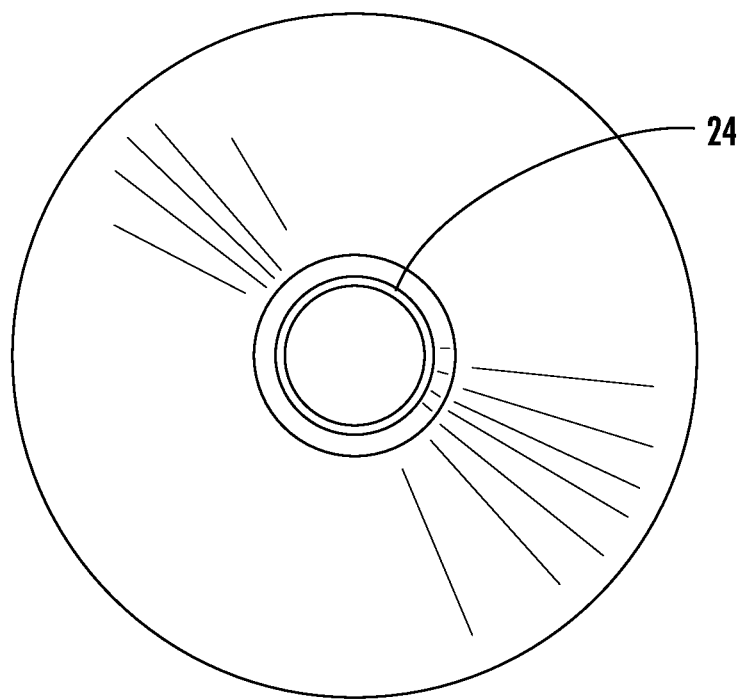
FIG. 14 is a bottom view of the (integrated) water filter and dispenser assembly of FIG. 12.

Another integral water filter and dispenser assembly of the present invention is shown in FIGS. 12-14 that has the same general exterior shape as the assembly of FIGS. 8-11 and is also engaged by push fitting into position and engaging a fastener such as a compression nut. Water flows into the center aperture 60 of the water treatment medium, which typically has a folded texture (toothed cross-section) that has a solid base portion 62. The water encounters the solid base portion 62 forcing water to flow laterally from the inside of the water treatment medium 60 outward in a typically substantially radially manner to peripheral water flow channels 64. The peripheral water flow channels 64 allow treated water to flow to the outlet 24 where the treated water is immediately dispensed to the user without traveling through further internal appliance conduits.

The device of FIGS. 12-14, the water treatment medium is not adhesively held with a hot melt adhesive to seal against by-pass flow. Instead the entire bottom portion or at least substantially all of the bottom portion including the center are sealed against water flow. The water filter and dispensing assembly 20 typically has a plurality of spaced apart radially extending water treatment medium supports 65 that hold the water treatment medium in a position above the outlet 24.

Figures 15A, 15B:
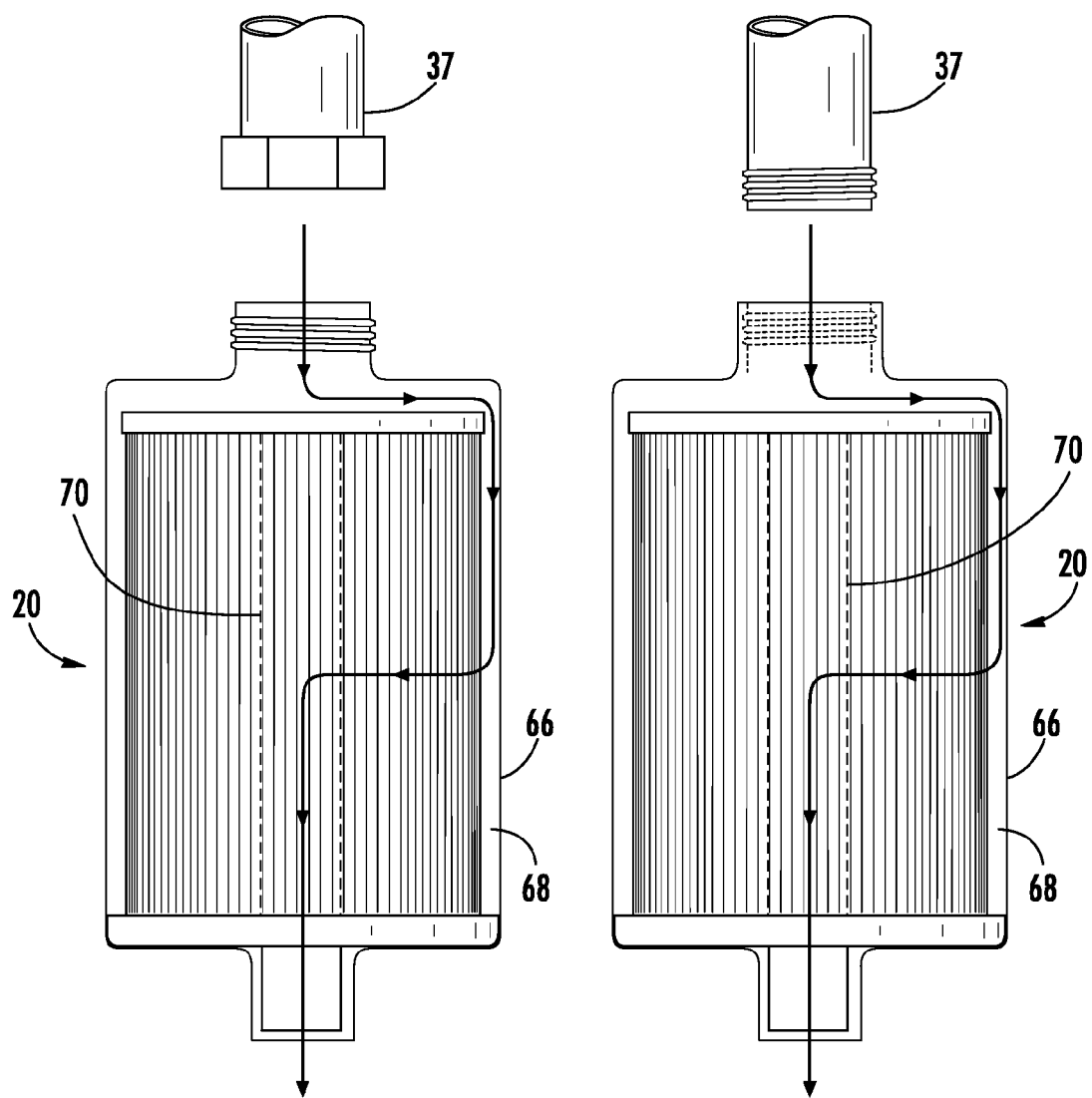
FIG. 15A is an elevated cross-sectional view of another (integrated) water filter and dispenser assembly with external threading on the top of the (integrated) water filter and dispenser assembly to engage the water outlet of the appliance.
FIG. 15B is an elevated cross-sectional view of another (integrated) water filter and dispenser assembly with external threading on the top of the water filter and dispenser system to engage the water outlet of the appliance.

Another integral water filter and dispenser assembly of the present invention is shown in FIGS. 15A-B. FIGS. 15A-B show a cartridge style filter adhered typically using a hot melt adhesive into a housing 66. The housing 66 is pushed onto existing spigot using a force fit and at least one O-ring to seal and a compression nut or other fastener used to engage the cartridge into place. Alternatively, self tapping threads on the interior (FIG. 15B) or exterior (FIG. 15A) may matingly engage threads on the water conduit 37. Water flows from the water conduit 37 into the housing 66. The top of the water treatment medium is typically sealed such that water flows to the circumferential exterior space 68, through the water treatment medium inward to a central channel 70 that delivers water to the outlet 24.

Figure 16:
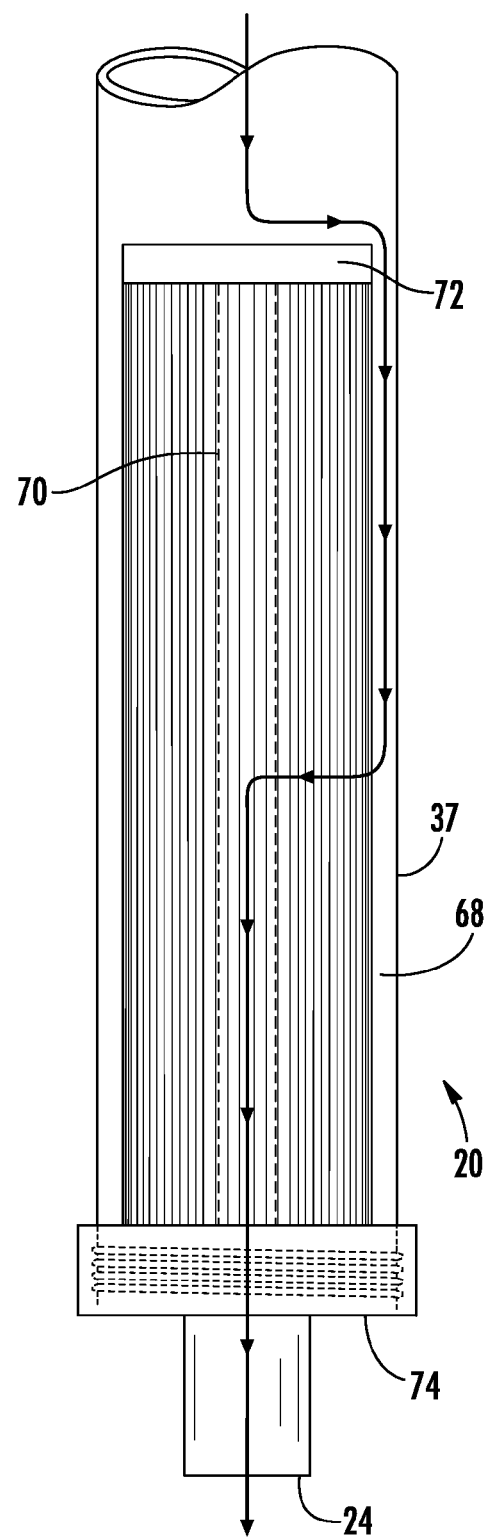
FIG. 16 is an elevated schematic view of another (integrated) water filter and dispenser assembly.
Figure 17:
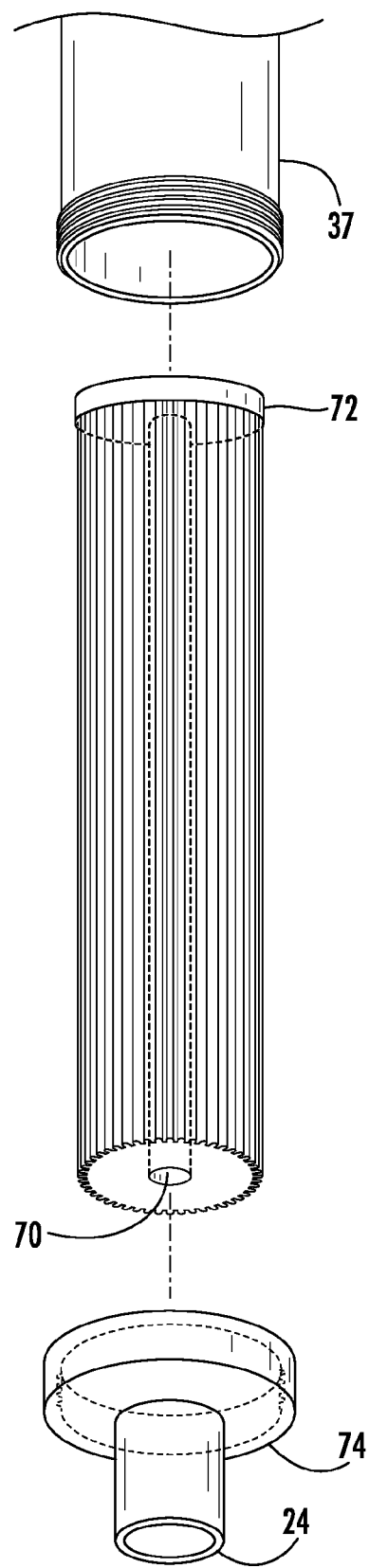
FIG. 17 is an exploded perspective view of the (integrated) water filter and dispenser assembly of FIG. 16.
Figure 18:
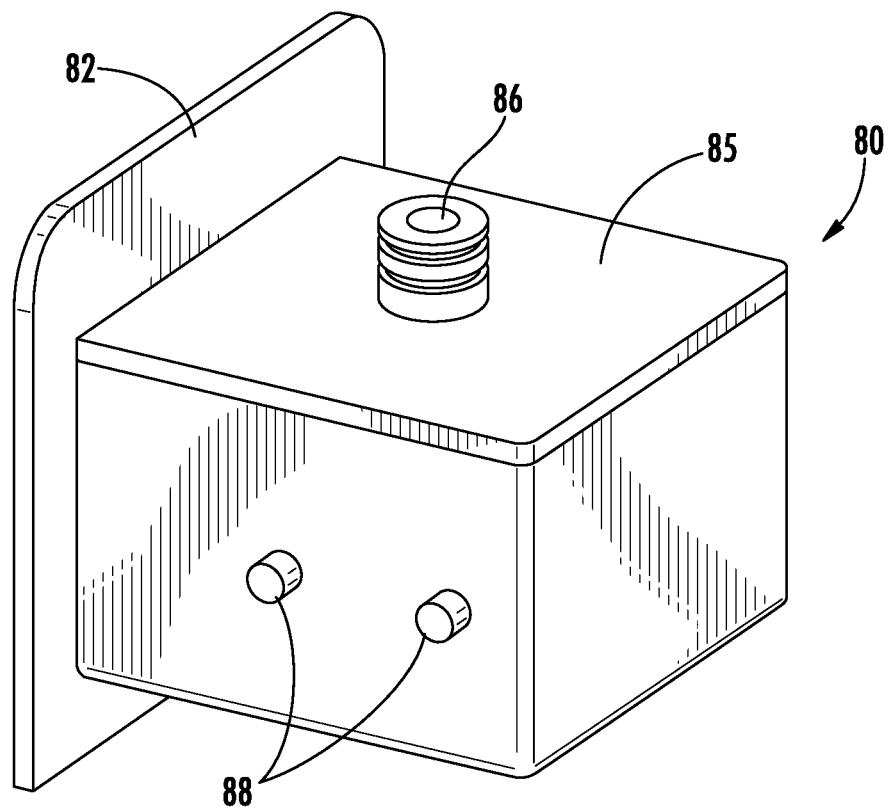
FIG. 18 is a perspective view of another (integrated) water filter and dispenser assembly.
Figure 19:
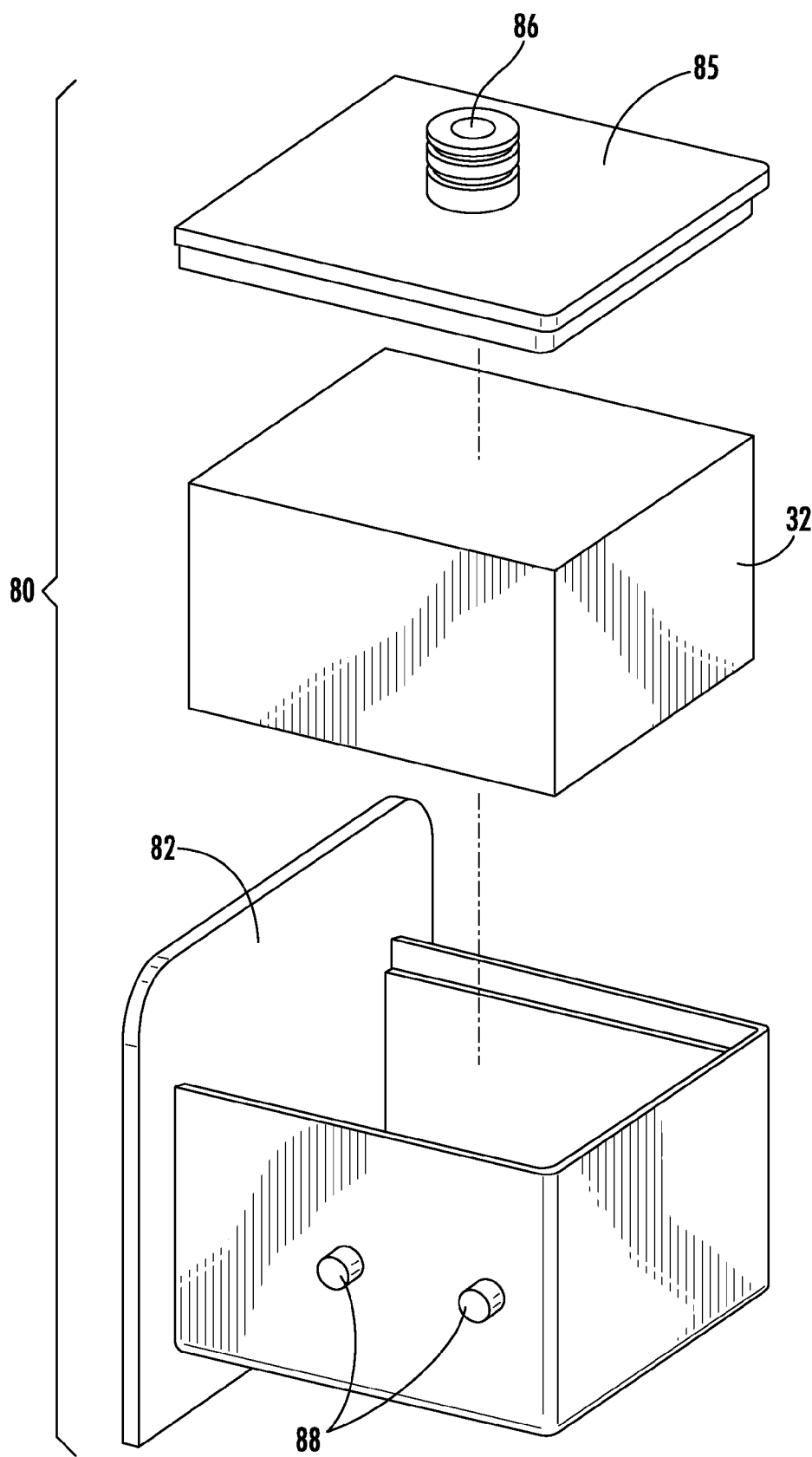
FIG. 19 is an exploded view of the (integrated) water filter and dispenser assembly of FIG. 18.

Another integral water filter and dispenser assembly of the present invention is shown in FIGS. 16-17. The cartridge of FIGS. 16-17 is similar to the cartridge of FIGS. 15A-B and water flows from the circumferential exterior space 68 inwardly through the water treatment medium 32 and into the central channel 70 that delivers the treated water to the outlet 24. The cartridge typically includes a cap 72 to force the water axially outward to the circumferential exterior space 68. As discussed above, the water then is forced inward and treated. To install the filter cartridge, the entire assembly 20 is inserted into the interior volume of the appliance water conduit 37, typically proximate the dispenser, and a self threading dispenser bottom 74. The self threading dispenser engages the conduit 37 and holds the cartridge in place and seals against leakage.

Figure 20A:
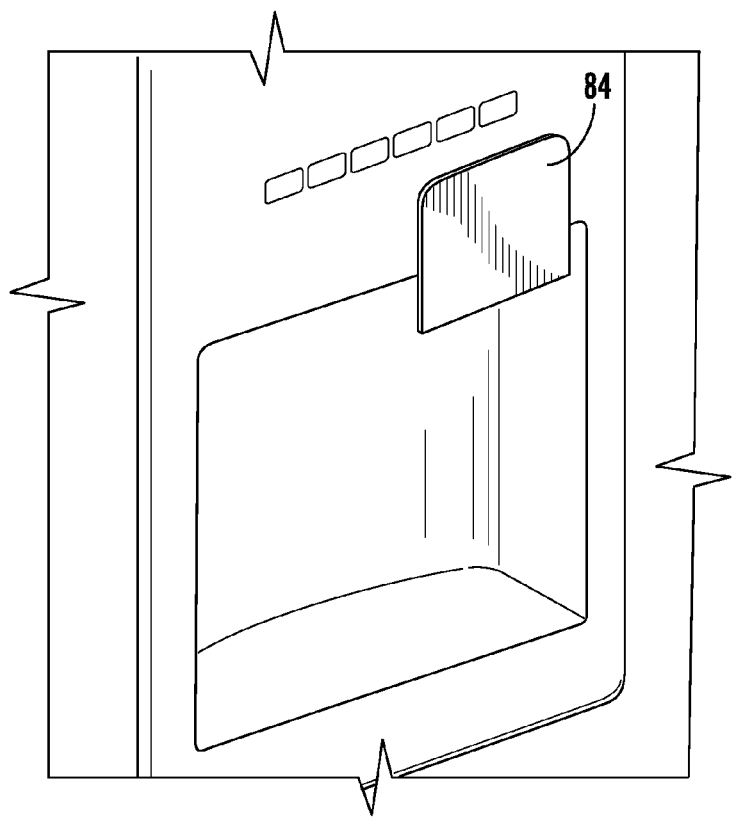
FIGS. 20A-C are perspective views of certain stages of the removal/insertion of the (integrated) water filter and dispenser assembly of FIG. 18.
Figure 20B:
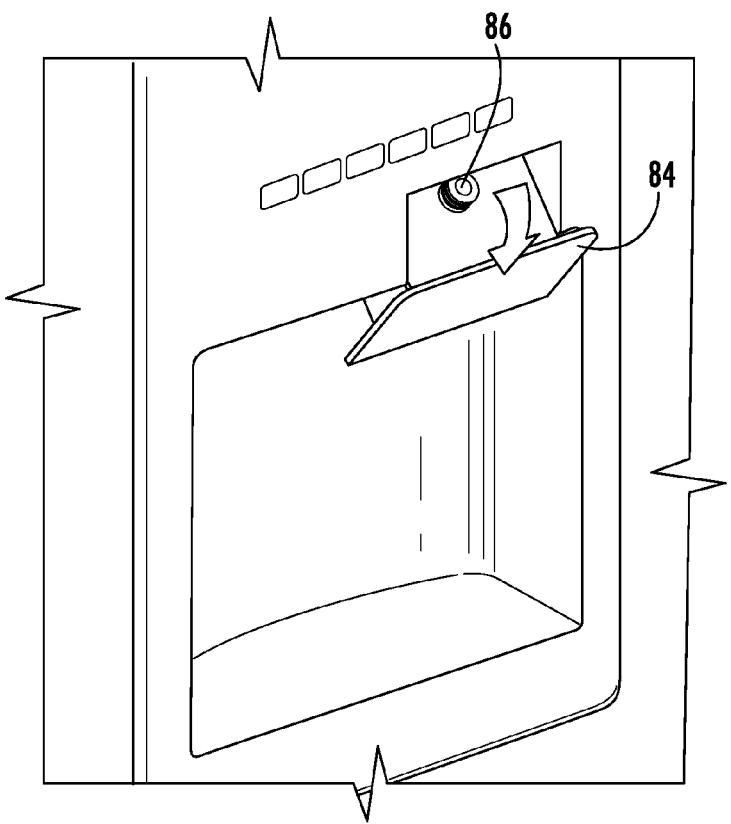
Figure 20C:
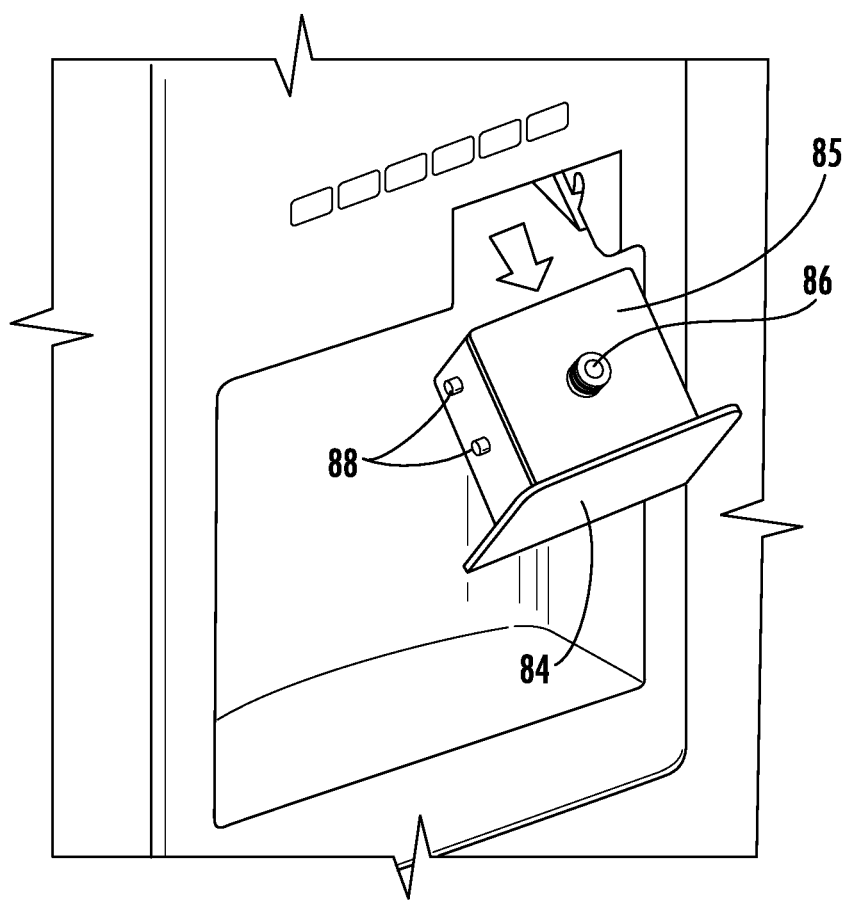

Another integral water filter and dispenser of the present invention is shown in FIGS. 18-20C. The water filter and dispenser assembly 20 of FIGS. 18-20C is typically a rectangular prism shaped housing 80. The housing 80 typically has six sides where one of the sides extends further than the others to create a perimeter flange 82. The opposite side surface 84 of the perimeter flange 82 typically is of the same color as the exterior of the appliance or a complimentary color such that when installed as shown in FIG. 20A, the filter is aesthetically well received by the user. The assembly 20, when installed is typically flush with the appliance outer wall. The water treatment medium 32 is spaced within the interior volume of the water filter and dispenser assembly 20 and a top section 85 with an appliance conduit engaging filter inlet 86. At least one side wall typically has snap fit attachment members 88, which can be pegs as shown or other similar construction. As with the other integral water filter and dispenser assemblies of the present invention, the assembly 20 may be engaged and disengaged with the appliance by hand by a user without the use of tools. As shown in FIGS. 20A-C, the (integrated) water filter and dispenser assembly 20 can be rotated into and out of engagement with the appliance to supply filter functionality and also replace the water outlet along with each filter replacement. Typically, the water filter and dispenser assembly is removed by grouping the water filter and dispenser assembly and applying a generally downward force until the assembly disengages. It is typically engaged by following the opposite course and applying a force by hand and rotating to engage the water filter and dispenser assembly, typically a snap fit connection. In this manner, with each filter replacement made by a user, the outlet is inherently disinfected, because it is replaced along with the water filter portion. A more sanitary and bacterial resistant system is provided by the present invention because the water dispenser is replaced along with the filter housing and water treatment medium and, instead of removing water treatment and sanitizing components from water and passing filtered water through conduits to the dispenser, the water treatment and sanitizing components such as chlorine are allow to remain in the water until the water reaches is dispensing location or where the water is to be filtered and used by the appliance. Conceivably this system could be used in connection with a replaceable filter at the water inlet to an ice maker.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. An appliance comprising:
    a water source inlet that receives intake water from a water source and a water outlet proximate a water dispensing location on a door of the appliance in fluid communication with one another via one or more water conduits spaced within the appliance;
    a removable integral water filter and dispenser assembly configured to be removably engaged and disengaged with the water outlet of the appliance by hand without the use of tools comprising:
        a housing having at least one side wall, a top, and a bottom defining an interior volume; a water outlet engagement system that fluidly engages the removable water filter and dispenser assembly and the water outlet in a fluid tight manner and configured to allow water received from the water outlet into engagement with one or more water treatment medium spaced within the interior volume of the housing; and
        a treated water dispensing outlet configured to deliver water treated by the at least one water treatment medium for use or consumption wherein treated water leaving the dispensing outlet does not travel through a further appliance water conduit.

2. The appliance of claim 1, wherein the water outlet of the appliance is connected with the water inlet on the top surface of the housing by a means for engaging the housing to the water outlet of the appliance.

3. The appliance of claim 1, wherein the housing further comprises an upwardly extending collar circumferentially spaced about a water receiving aperture in the top of the housing wherein the collar is configured to sealingly engage the water filter and dispenser assembly to the water outlet of the appliance.

4. The appliance of claim 3, wherein the at least one water treatment media is one or more media chosen from the group consisting of: activated carbon particles, an activated carbon particle with alumninosilicate bonded with titanium dioxide and nanoparticulate zinc oxide mesoporous activated carbon, carbon powder, particles sintered with a plastic binder, carbon particles coated with a silver containing material, a block of porous carbon, ion exchange material, resin beads, flat filtration membranes, fibrous filtration structures, zeolite particles or coatings, polyethylene, charged-modified glass webs, melt blown glass webs, microfiber glass webs, alumina, an aluminosilicate material, and a diatomaceous earth.

5. The appliance of claim 3, wherein the upwardly extending collar has at least one O-ring engaged to an interior surface of the collar and wherein a compression nut is fitted around an exterior surface of the collar to fasten the collar to the water dispensing outlet of the appliance.

6. The appliance of claim 3, wherein the water outlet of the appliance has internal threads that matingly engage external threads on an outside surface of the collar.

7. The appliance of claim 1, wherein the appliance further comprises a mounting bracket that is a separate component from the appliance and that is operably engaged to the appliance, wherein the mounting bracket includes a mechanism to engage the housing of the removable integral water filter and dispenser assembly via an internal or external threading defined within the mounting bracket that cooperates with a portion of the housing, and wherein the treated water dispensing outlet is defined within the bottom of the housing.

8. The appliance of claim 1, wherein the at least one water treatment medium comprises an activated carbon and an aluminosilicate.

9. The appliance of claim 1, wherein the housing is cylindrically shaped and spaced at least substantially within the water outlet of the appliance and the water outlet threadably engages a bottom and wherein the removable water filter and dispenser assembly has a solid top cap portion that prevents water from flowing into a treated water flow channel within the at least one water treatment medium such that untreated water flows around the perimeter of the removable water filter and dispenser assembly and flows inwardly through the water filter and dispenser assembly and into the treated water flow channel and out the treated water dispensing outlet.

10. The appliance of claim 9, wherein a peripheral edge of the water treatment medium or the water treatment medium housing is pleated.

11. The appliance of claim 1, wherein at least one water treatment medium is spaced within the housing and adhered to the housing creating a water tight seal between a side of the at least one water treatment medium and the housing of the removable water filter and dispenser assembly and the removable water filter and dispenser assembly is thereby configured to force untreated water to physically pass through a thickness of the at least one water treatment medium from a top surface of the at least one water treatment medium to a bottom surface of the water treatment medium.

12. The appliance of claim 11, wherein the at least one water treatment medium is a compacted mass that is substantially shaped to be received within and is of a same approximate cross-sectional shape as the interior volume of the housing.

13. A method of filtering water being dispensed from an appliance and periodically replacing a water filter of the appliance and a water dispensing outlet of the appliance comprising the steps of:

installing a first removable integral water filter and dispenser assembly into fluid engagement with a water outlet of an appliance proximate a water dispensing location on the door of the appliance by hand without the use of tools comprising:

a housing having at least one side wall, a top, and a bottom defining an interior volume; a water outlet engagement system that fluidly engages the removable integral water filter and dispenser assembly and the water outlet in a fluid tight manner and configured to allow water received from the water outlet into engagement with one or more water treatment media spaced within the interior volume of the housing; and a treated water dispensing outlet;

filtering and dispensing water of the appliance through the treated water dispensing outlet for a period of time using the first removable water filter and dispenser assembly, wherein treated water leaving the dispensing outlet does not travel through a further appliance water conduit;

disengaging the first removable water filter and dispenser assembly, which includes the treated water dispensing outlet, by hand and without the use of tools; and installing a second removable water filter and dispenser assembly into fluid engagement with the water outlet of the appliance proximate a water dispensing location on the door of the appliance by hand without the use of tools wherein the second removable water filter and dispenser assembly comprises:

a second housing having at least one side wall, a top, and a bottom defining an interior volume; a second water outlet engagement system that fluidly engages the removable integral water filter and dispenser assembly and the water outlet in a fluid tight manner and configured to allow water received from the water outlet into engagement with one or more water treatment media spaced within the interior volume of the housing; and a second treated water dispensing outlet.

14. The method of claim 13, wherein the steps of installing and replacing the first and second removable water filter and dispenser assemblies are entirely done by hand and without the use of tools by rotating the removable water filter and dispenser assemblies between an engaged position and a disengaged position.

15. The method of claim 14, wherein the water treatment media comprises at least one water treatment media chosen from the group consisting of: activated carbon particles, mesoporous activated carbon, activated carbon powder, particles sintered with a plastic binder, carbon particles coated with a silver containing material, a block of porous carbon, ion exchange material, resin beads, flat filtration membranes, fibrous filtration structures, zeolite particles or coatings, polyethylene, charged-modified glass webs, melt blown glass webs, microfiber glass webs, alumina, an aluminosilicate material, and a diatomaceous earth.

16. The method of claim 14, wherein the water treatment media is a combination of water treatment media and includes at least an aluminosilicate and an activated carbon material and wherein the method further comprises disposing of the first removable water filter and dispenser assembly.

17. A removable and integral water filter and dispenser assembly configured to be removably engaged and disengaged with a water outlet of an appliance by hand without the use of tools by rotating the removable and integral water filter and dispenser about an axis of rotation or through a curvilinear pathway comprising:

a housing having side walls, a top and a bottom defining an interior volume; a water dispensing outlet engagement system that fluidly engages the removable integral water filter and dispenser assembly and the water dispensing outlet in a fluid tight manner and configured to allow water received from the water outlet of the appliance into engagement with a water treatment media spaced within the interior volume of the housing wherein the water treatment media comprises at least one water treatment media chosen from the group consisting of: activated carbon particles, mesoporous activated carbon, activated carbon powder, particles sintered with a plastic binder, carbon particles coated with a silver containing material, a block of porous carbon, ion exchange material, resin beads, flat filtration membranes, fibrous filtration structures, zeolite particles or coatings, polyethylene, charged-modified glass webs, melt blown glass webs, microfiber glass webs, alumina, an aluminosilicate material, and a diatomaceous earth; and a downwardly extending treated water dispensing outlet integral with the bottom of the housing and configured to deliver water treated by the at least one water treatment media for use or consumption wherein treated water leaving the treated water dispensing outlet does not travel through a further appliance water conduit.

18. The removable and integral water filter and dispenser assembly of claim 17, wherein the housing further comprises a collar that engages and extends upwardly from the top of the housing and wherein the collar is proximate to and surrounds an aperture configured to permit fluid flow into the interior volume of the housing and wherein the collar has threads on either an interior surface of the collar or an exterior surface of the collar.

19. The appliance of claim 1, wherein the one or more water treatment medium is an activated carbon particle with alumninosilicate bonded with titanium dioxide and nanoparticulate zinc oxide.

20. The appliance of claim 1, wherein the one or more water treatment medium reduces bacteria by log 4 or more.

21. The appliance of claim 20, wherein the one or more water treatment medium reduces algae about 50% to 80% while maintaining a water flow through the water treatment medium at a rate of at least 1 liter per minute.

22. The appliance of claim 1, wherein the one or more water treatment medium reduces algae about 50% to 80% while maintaining a water flow through the water treatment media at a rate of at least 1 liter per minute.

* * * * *